United States Patent [19]

Asplen, Jr.

[11] Patent Number: 6,044,354
[45] Date of Patent: *Mar. 28, 2000

[54] COMPUTER-BASED PRODUCT PLANNING SYSTEM

[75] Inventor: Brennan William Asplen, Jr., Apopka, Fla.

[73] Assignee: Sprint Communications Company, L.P., Kansas City, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,744

[22] Filed: Dec. 19, 1996

[51] Int. Cl.$^7$ .............................. G06F 17/60; G06F 17/30
[52] U.S. Cl. ........................... 705/7; 705/1; 705/8; 705/9
[58] Field of Search .................................. 705/7, 8, 9, 14, 705/26, 1; 364/468.01, 468.06

[56] References Cited

U.S. PATENT DOCUMENTS

| | | | |
|---|---|---|---|
| 3,736,409 | 5/1973 | Broyan | 235/376 |
| 5,172,313 | 12/1992 | Schumacher | 705/7 |
| 5,433,546 | 7/1995 | Kershaw | 402/79 |
| 5,506,783 | 4/1996 | Tanaka et al. | 364/468.07 |
| 5,524,077 | 6/1996 | Faaland et al. | 705/8 |
| 5,548,506 | 8/1996 | Srinivasan | 705/8 |
| 5,557,515 | 9/1996 | Abbruzzese et al. | 705/9 |
| 5,596,502 | 1/1997 | Koski et al. | 364/468.01 |
| 5,655,118 | 8/1997 | Heindel et al. | 395/614 |
| 5,765,140 | 6/1998 | Knudson et al. | 705/9 |
| 5,983,194 | 11/1999 | Hogge et al. | 705/7 |

OTHER PUBLICATIONS

Keiser, Gregg "Information manager(First Looks) (software Review) (Evaluation)", P C Magazine, Dialog File 148, Accession No. 07742113, Mar. 1996.

*Primary Examiner*—Allen R. MacDonald
*Assistant Examiner*—Romain Jeanty
*Attorney, Agent, or Firm*—Harley R. Ball

[57] ABSTRACT

A product planning system uses a server (12) for storing centralized data accessible by remote stations (14). The system provides for uniform product planning. throughout an organization while ensuring thoroughness, control, and rapid implementation, and includes the planning chapters of idea assessment, opportunity assessment, business plan, implementation planning and product launch implemented by performing associated tasks customized according to the product.

18 Claims, 5 Drawing Sheets

6,044,354

COMPUTER-BASED PRODUCT PLANNING SYSTEM

BACKGROUND OF THE INVENTION

1. Field of the Invention

The present invention relates to the field of computer-based product planning systems. In particular, the invention is concerned with a system providing for uniform product planning throughout an organization while ensuring thoroughness, control and rapid implementation, and includes the planning chapters of idea assessment, opportunity assessment, business plan, implementation planning and product launch, all implemented by performing associated tasks customized according to the product.

2. Description of the Prior Art

In the prior art, there is no automated system for the complete development of a product. Typical computer-based prior art systems focus on only one aspect of product development such as engineering or manufacturing. These systems fail to address adequately other important needs such as new idea development, opportunity assessment from a marketing standpoint, business planning, implementation planning and product launch.

SUMMARY OF THE INVENTION

The present invention solves the prior art problems discussed above and provides a distinct advance in the state of the art. The product planning system hereof guides the planning of a product from idea to market launch.

The preferred embodiment of the present invention includes a computer having a computer program defining a plurality of planning chapters including idea managing, opportunity assessment, business plan, implementation planning and product launch. Each chapter includes a number of tasks arranged in sections and subsections. Some tasks prompt for the receipt of information into the computer concerning the product and other tasks prompt a decision, approval or command. Other preferred aspects of the present invention are discussed herein.

DETAILED DESCRIPTION OF THE PREFERRED EMBODIMENT

Figure 1:
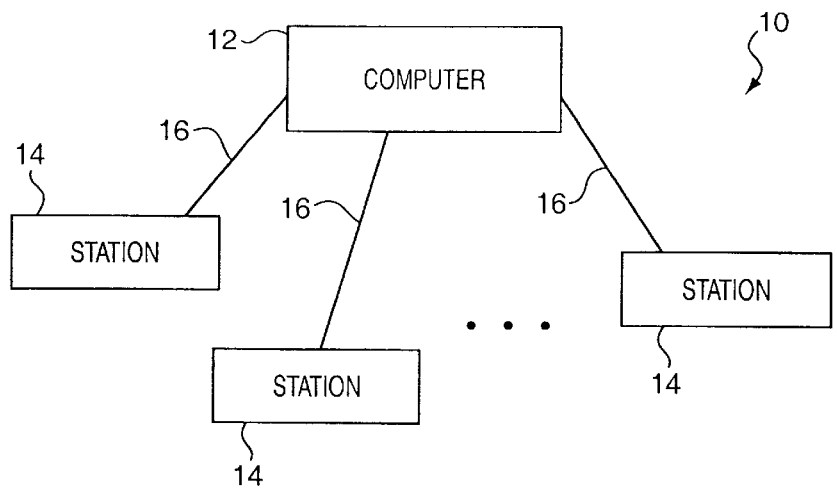
FIG. 1 is a schematic block diagram illustrating the preferred apparatus of the present invention.

FIG. 1 illustrates the preferred apparatus 10 for implementing the present invention. Apparatus 10 includes computer 12 intercoupled with stations 14 by way of communications lines 16. Computer 12 is preferably a microcomputer such as a network server having substantial ability for mass storage of data, but could include a minicomputer or mainframe. Stations 14 are preferably microcomputers such as personal computers each operable for running application programs, and having a monitor for displaying computer screens and a keyboard or other device for providing input to computer 12. Communications lines 16 include those communications capabilities used by an organization for enabling communication with a central computer such as a local area network (LAN), wide area network (WAN) and telecommunications lines for internet and e-mail capability, for example.

In the preferred embodiment, the present invention is implemented by way of a computer program designated by the brand name TURBOPLAN$^{SM}$ running as an application program on computer 12 or at each station 14, or a combination, depending upon the needs of a particular organization. The preferred program is an application contained within and implemented by LOTUS NOTES software version 4.x and subsequent releases.

As illustrated in FIGS. 1A–5, the preferred planning system includes five chapters or stages: idea managing, opportunity assessment, business plan, implementation planning and product launch with each chapter being implemented by implementing associated tasks organized into sections and subsections. In general, a responsible person is assigned to each chapter and each task to be implemented. When the tasks of a particular chapter have been complete, that chapter is also marked as completed by the responsible person. The planning process then moves to the next chapter in sequence, although the preferred embodiment allows chapters and tasks to be omitted and other tasks added as needed for a particular product. By following the process, planning is conducted from idea to product launch in a manner that is uniform, thorough, accurate and under control while, at the same time, remaining flexible and reducing development cycle time as compared to the prior art. As used herein, the term "product" includes goods, services, projects and the like. FIGS. 1A–5 illustrate each chapter with an assigned number (1.0 through 5.0, respectively) with the tasks associated with each chapter organized into sections (e.g., 3.1–3.8) and subsections (e.g., 3.1.1–3.1.7).

Figure 1A:
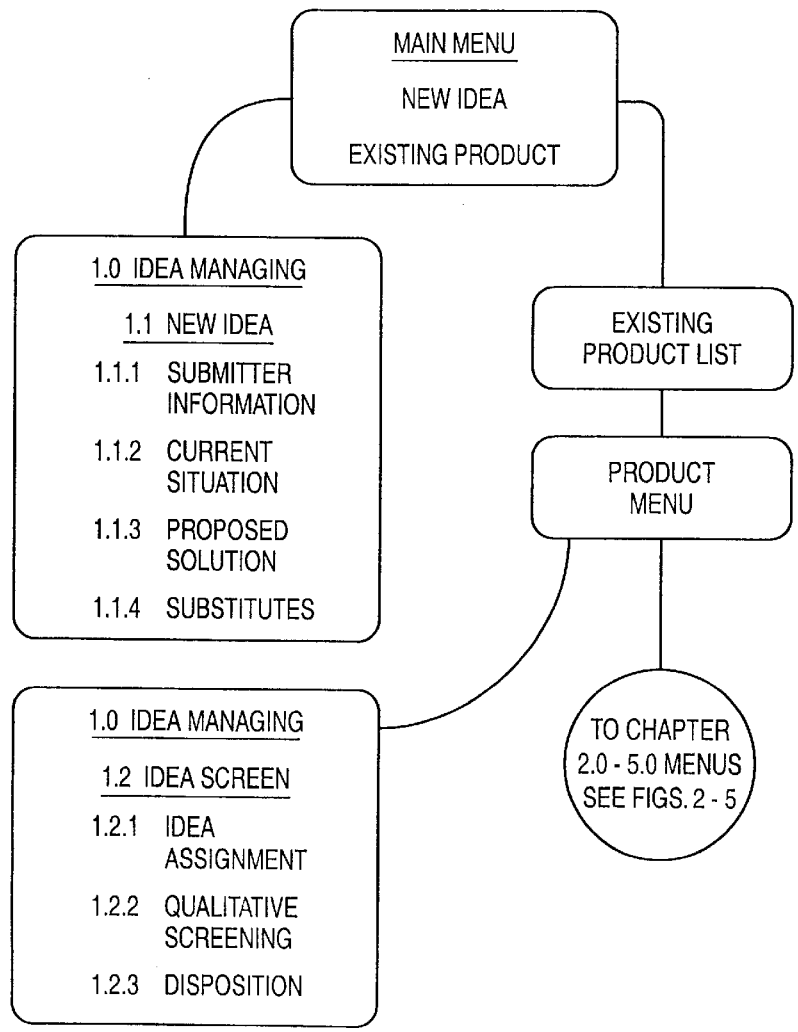
FIG. 1A is a schematic representation of the computer display screens for the idea managing chapters and respective tasks implemented by way of the apparatus of FIG. 1.

Referring to FIG. 1A, the program initially presents to a user at station 14 a main menu screen presenting various selections including the process for entering a new idea for a product or for dealing with an existing product already in the planning process. If the user wishes to enter an idea for a new product, the selection is made and screens are presented prompting the user to enter pertinent information for chapter 1.0 idea managing, section 1.1 new idea. This information is entered by fields and includes the user's identity, such as name, telephone number, address and department, the current situation, environment or problem that gave rise to the new idea, the idea or solution itself and any information concerning existing products on the market that might solve the problem.

The new idea information is then received by computer 12 and stored in the central data base thereof. The program automatically assigns a unique identification number that is carried throughout the entire process, the preferred identification number made up of the date and time down to the second of submission. A system administrator, for example, or other responsible individual, assigns new idea submissions to someone as evaluator for initial screening, typically someone who has responsibility for the area to which the idea pertains. Once submitted, the new idea information now pertains to an existing product or idea and the assigned evaluator selects the existing product option from the main menu, then the product menu and next, the idea screening menu. With this selection, the information described above is presented in chapter 1.0 idea managing, section 1.2 idea screen for new ideas that have not yet been evaluated. The assigned evaluator is the responsible person for the idea managing chapter and is identified by a unique identifier.

Upon selection of a new idea for screening, the idea is evaluated qualitatively according to predetermined criteria. Preferably, the idea is assigned a score from 1–10 for each of certain criterion as determined by the organization. The criteria can include such things as how the product idea relates to the organization's strategies, whether it will be competitive, how the product would fit with other products within the organization and the like. In this way, the product is evaluated according to predetermined criteria. The program calculates an overall average score and the evaluator uses this information to decide whether the product should be discarded, put on hold, or passed to the next chapter. For any of these decisions, it is preferred that the evaluator provide comments concerning the basis of the decision. Additionally, a reply is sent to the person who submitted the idea concerning the results of the evaluation. This can be done in the form of standard letters customized for the particular situation.

This completes the tasks for the idea managing chapter and the evaluator then marks this chapter 1.0 as complete. Only the responsible person, as identified by the unique identifier and assigned to a chapter, may mark a chapter as complete. After a chapter is marked as complete, further comments may not be entered for storage in association with the chapter. The person responsible for a completed chapter may reopen that chapter if needed.

Figure 2:
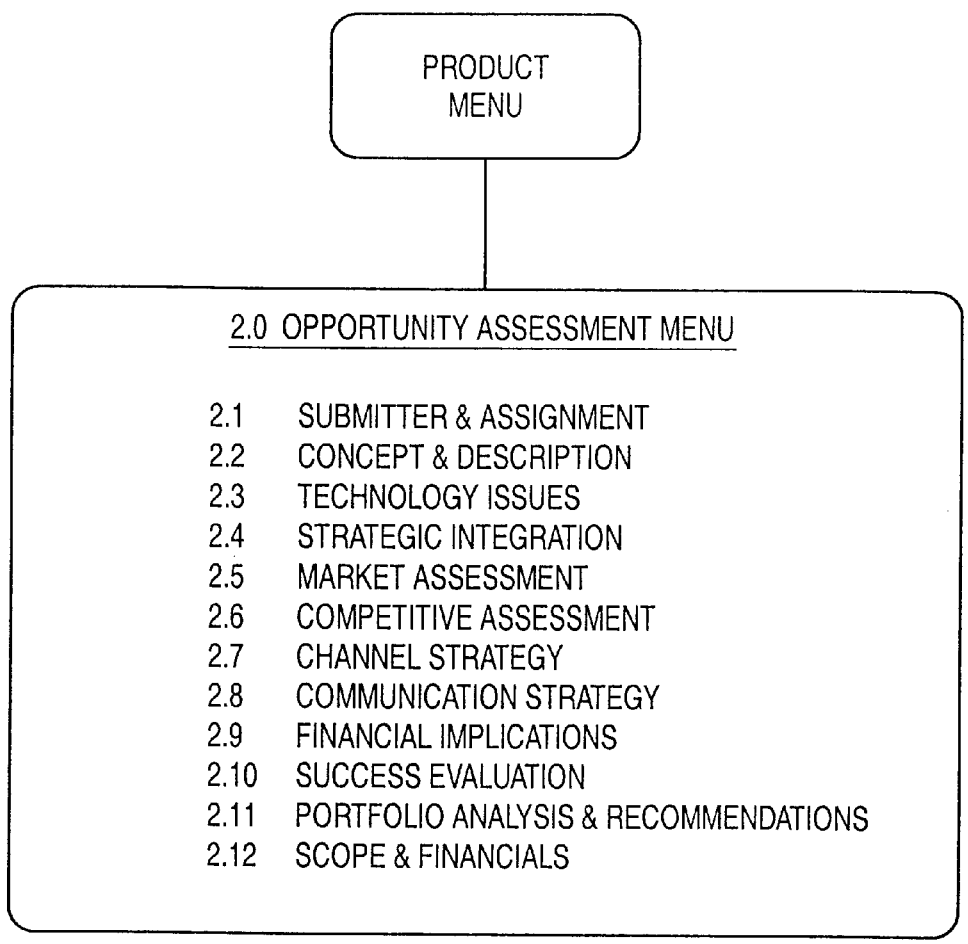
FIG. 2 is a schematic representation of the computer display screens for the opportunity assessment chapters and respective tasks implemented by way of the apparatus of FIG. 1.

Upon completion of the idea screening section 1.2, the planning process for the product would typically move to the opportunity assessment chapter (2.0) illustrated in FIG. 2. The user enters by selecting this chapter from the product menu. In this and the other chapters, each task as represented by the sections and subsections is organized as a field for receipt and storage of information in computer 12.

Information already entered in chapter 1.0 is carried forward and reentered in chapter 2.0 where appropriate. For example, the product description is carried forward along with the product identifier. This avoids the need for re-entering information previously entered and also prevents the loss of pertinent information.

In general, opportunity assessment chapter 2.0 is for determining if there is a reasonable opportunity for success with the product. This chapter establishes the feasibility of the product from a technological, market and strategic perspective. In this chapter, detailed information is collected concerning the product. Each section corresponds to a topic and field for entry of information about the product with respect to the subsection topic. With each section, a screen is presented prompting entry of the needed information. In the preferred embodiment, a team is assigned to the chapter with the various team members assigned responsibility for completion of the associated tasks corresponding to the sections.

For example, section 2.4 deals with strategic integration and prompts the assigned team member to enter information concerning this topic. This can be further refined by prompting the information entry by specific questions such as how the product will fit in the organization and what organizational barriers need to be addressed.

Upon entry of the requested information into a subsection, a responsible team member marks this section as complete as identified to computer 12 by that person's unique identifier. Upon completion of all of the section tasks, the person responsible for this chapter as a whole then determines whether sufficient opportunity exists to warrant continuation with the planning process. One of the sections includes financials (2.12) and a summary screen is provided comparing such things as multi-year revenue, capital and expense with organizational criteria for margins, rates of return, economic value added and break-even year. Thus, the responsible person can evaluate the product with regard to this criteria.

If the product warrants further development, chapter 2.0 is marked as complete. Other options include disapproving the product at which the point the process stops, or placing the process on hold.

Figure 3:
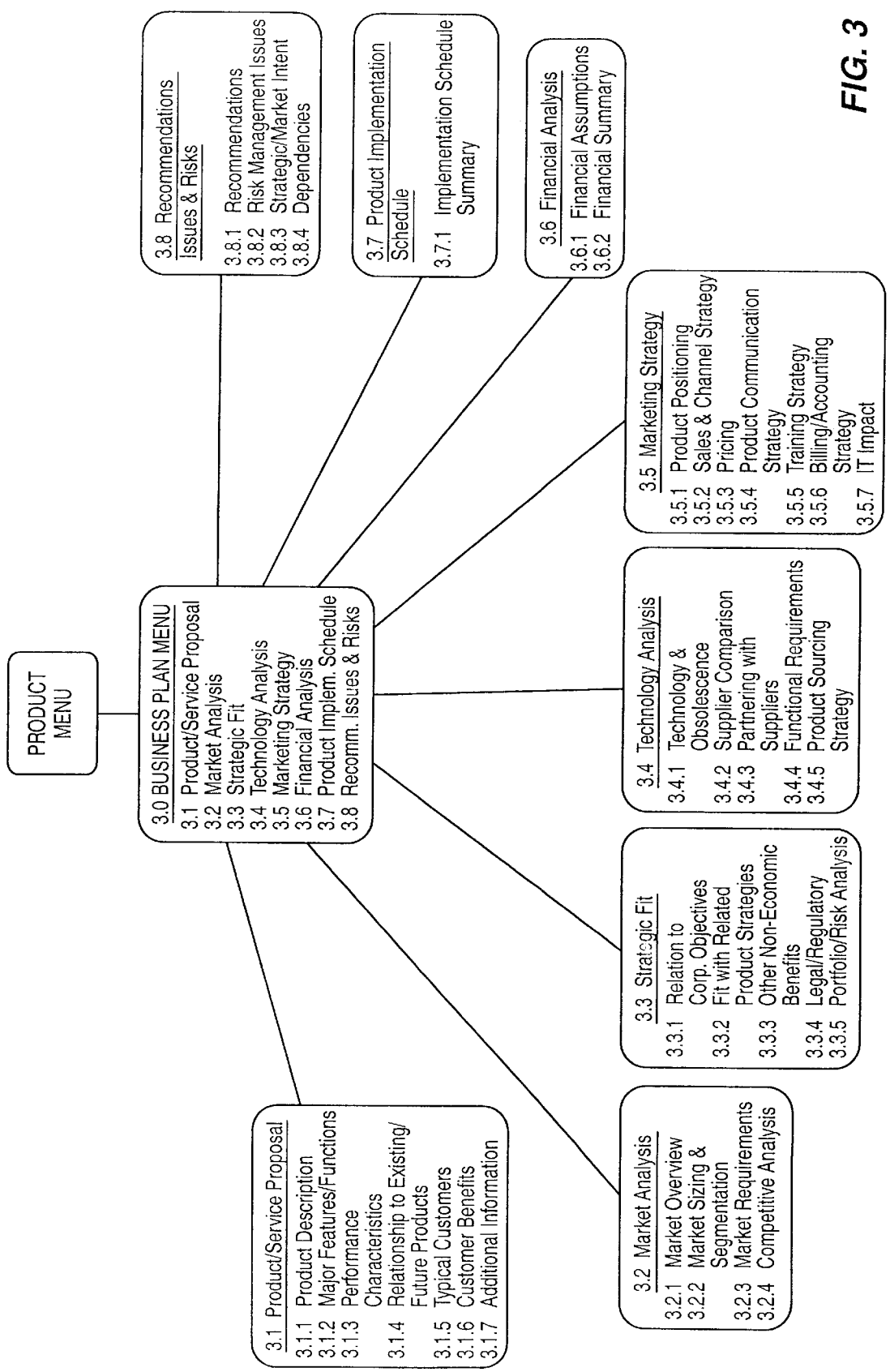
FIG. 3 is a schematic representation of the computer display screen for the business plan chapter and respective tasks implemented by way of the apparatus of FIG. 1.

FIG. 3 illustrates business plan chapter 3.0. Due to the complexity of this chapter, it is organized into sections and subsections. This chapter uses research, testing, trialing, developing and sourcing to determine the feasibility for the product. The business plan identifies funding for the product and contains more in-depth information than opportunity assessment chapter 2.0.

Business plan chapter 3.0 is entered by product menu selection and pertinent information entered in the previous chapters is carried forward and reentered where appropriate. A responsible person is assigned to this chapter and team members assigned responsibility for the various tasks represented by the sections and subsections. Screens are presented corresponding to each section and subsection prompting the entry of information regarding the specified topic. Some of the topics are the same as chapter 2.0 but require further detail. Accordingly, the corresponding information entered in chapter 2.0 for a particular topic is carried forward to the corresponding topic screen in chapter 3.0.

Business plan chapter 3.0 also handles business planning financials (section 3.6) including financial assumptions, financial summary, and location summaries. More particularly, this section of chapter 3.0 preferably calls a conventional spread sheet program such as EXCEL containing the Complex Asset Model. Financial summary screens are generated illustrating multi-year revenues, costs, rates of return and criteria representing the minimum financial requirements set by the organization.

Business plan chapter 3.0 further includes a subchapter requesting authorization for expenditures to implement the product. This is presented as an approval screen indicating those reviewers who approve the product for implementation. Reviewers are assigned according to an organizational criteria such as the level of funding requested and the department making the request. Each reviewer has access to the entire business plan and enters approval using a confidential, unique identifier.

It will be appreciated that the present invention enables the presentation of business plans to reviewers in a standardized format that soon becomes familiar and comfortable. With a standardized format for the organization, the reviewers do not need to search in different locations for pertinent information. Moreover, the organization defines what information is pertinent and this ensures that the required information is present for each product business plan. Provision is also made for each reviewer to enter comments explaining any disapproval.

After approval by the required reviewers, business plan chapter 3.0 is marked as complete. As with the previous chapters, the project can be disapproved or placed on hold which might occur, for example, if funding is not available until a later date.

Figure 4:
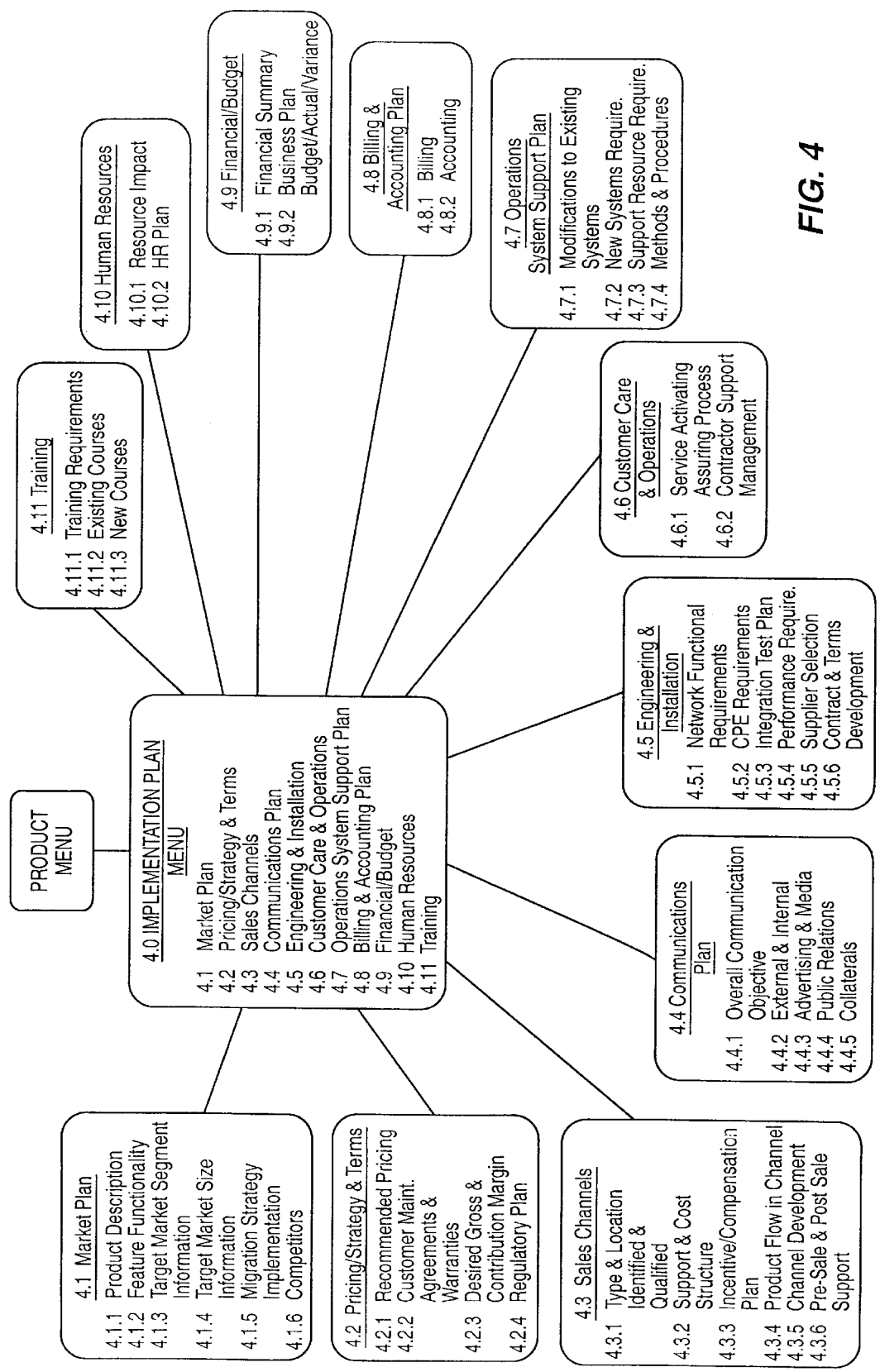
FIG. 4 is a schematic representation of the computer display screen for the implementation plan chapter and respective tasks implemented by way of the apparatus of FIG. 1.

The next chapter is implementation plan 4.0 illustrated in FIG. 4. The sections and subsections are configured to prompt for the detailed planning and information needed for actually implementing a product. The section topics include such things as market plan, engineering and human resources needs. The financial section 4.9 includes detail from the business plan and further includes, for example, subsection 4.9.2 which details a budget along with actual expenditures verses the budget and any corresponding variance. In this way, the implementation can be tracked to determine any deviation from plan and where that deviation is occurring.

Figure 5:
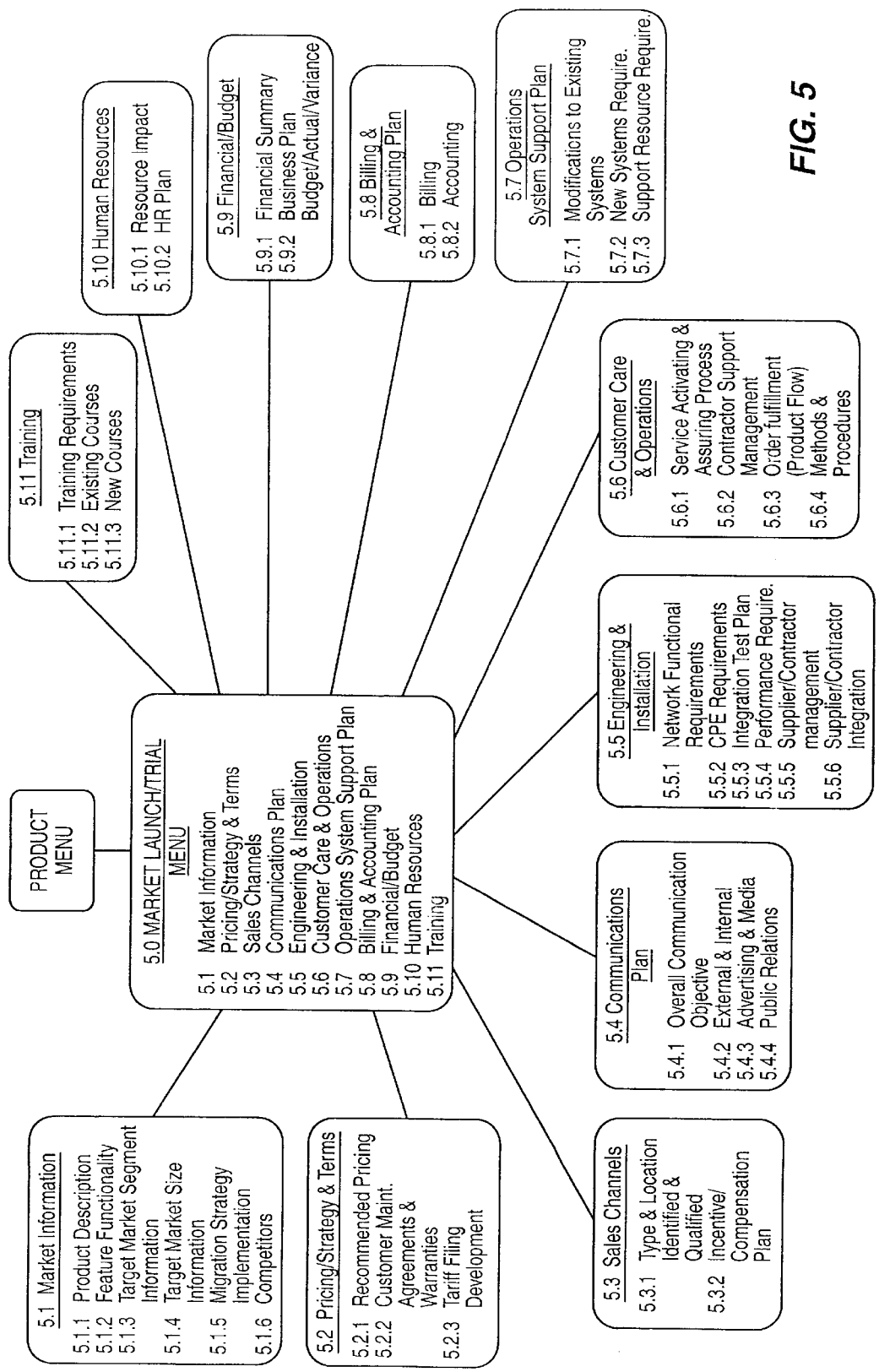
FIG. 5 is a schematic representation of the computer display screen for the product launch chapter and respective tasks implemented by way of the apparatus of FIG. 1.

The final chapter is product launch 5.0 illustrated in FIG. 5 and dealing with product trialing and launching. More particularly, chapter 5.0 provides overall product information and the plan for selected launch sites. As with the other chapters, chapter 5.0 is entered from the product menu, a screen is presented for each section and subsection representing tasks typically prompting for the entry of information concerning the screen topic, and responsible persons are assigned for chapter responsibility and for sections and subsections.

In the preferred embodiment, this is the only chapter than can be started while another chapter is in progress, allowing a product trial while in the midst of a business plan, for example. Additionally, this chapter allows multiple launches for various geographic locations and provides for launch analysis for each location. Upon completion of the tasks of chapter 5.0, this chapter is marked as complete.

A subsequent chapter is also contemplated dealing with product life cycle tracking. Such would be structured in a manner similar to the chapters discussed above and would include a comparison of actual multi-year results with those set forth in the business plan and implementation plan. With this tracking, the planning process can be improved.

The preferred embodiment also includes other features enhancing the utility of the invention and thereby the benefits to the users. For example, the sections and subsections of each chapter can be modified, deleted, or others added as needed to fit the needs of the organization.

Additionally, it is not required that all of the chapters be implemented or implemented in sequence. For example, it may be desired to initiate the planning process of the present invention with regard to products that are already in various stages of planning and development. In such cases, idea managing and opportunity assessment might not be needed. In other situations, an opportunity may be so significant that the implementation plan chapter or the product launch chapter may be the initial chapter, for example.

The present invention also provides a communications log that may be entered from screens throughout the planning process. This allows users to enter comments about a product, inform others about issues, or address particular issues. When communications are received into computer 12, they are logged according to product name, date, identification number and author which are handled as fields for sorting. Moreover, comments can be entered into a field defining a particular topic. In the preferred embodiment, the comments are maintained and stored with other data relating to the product planning process, and can be retrieved in association with a given topic or any of the other fields. In this way, the important information is not lost and is presented to all those having responsibility for a given topic.

Another significant aspect of the present invention is selective replication referring to the ability to replicate or pull in only those documents a user wishes to view. Conventional replication typically requires downloading an entire file, that is, all associated documents. This can result in many unneeded and unwanted documents. With selective replication, the user identifies only those documents that are wanted. For example, a person assigned responsibility for selected subsections of a chapter may wish to download only those documents pertaining to the subsections for which the person is responsible. These could be loaded into a portable computer, for example, allowing the responsible person to work on the various tasks while away from an assigned work station.

Selective replication also allows a user to upload the replicated documents reflecting work accomplished regarding particular topics. Computer 12 updates the data base upon receipt of the uploaded information.

Those skilled in the art will appreciate that the present invention encompasses many variations in the preferred embodiment described above. Having thus described the preferred embodiment of the present invention, the following is claimed as new and desired to secured by Letters Patent:

1. An automated computer based product development system, the system comprising:

a computer, wherein the computer includes:

product idea managing software operational when executed by a processor to direct the processor to receive idea information describing a new product and to evaluate the idea information based on predetermined criteria;

opportunity assessment software operational when executed by the processor to direct the processor to receive opportunity assessment information and process the opportunity assessment information and at least a portion of the idea information to generate an opportunity assessment report;

business planning software operational when executed by the processor to direct the processor to receive business planning information and process the business planning information and at least a portion of the opportunity assessment information to generate a business plan;

implementation planning software operational when executed by the processor to direct the processor to receive implementation information and process the implementation information, at least a portion of the business planning information and at least a portion of the opportunity assessment information to generate an implementation plan; and product launching software operational when executed by the processor to direct the processor to receive overall product information and process the overall product information, at least a portion of the implementation information, at least a portion of the business planning information and at least a portion of the opportunity assessment information to generate a product launching plan.

2. The system of claim 1, wherein the product idea managing software is operational to direct the processor to perform at least one task selected from the group consisting of:

receiving information into the computer describing the need for a new product, receiving information into the computer describing an idea for a new product, assigning a responsible person for evaluating the new product, evaluating the new product in accordance with the predetermined criteria, and receiving information into the computer indicating whether another one of the opportunity assessment software, the business planning software, the implementation planning software and the product launching software should be executed.

3. The system of claim 1 wherein opportunity assessment software is operational to direct the processor to receive information into the computer indicating the evaluation of the product with regard to the predetermined criteria.

4. The system of claim 1 wherein the business planning software is operational to direct the processor to perform at least one task selected from the group consisting of:

developing a new product description, performing a market analysis for the new product, determining a strategic fit for the new product, performing a technology analysis for the new product, developing a marketing strategy for the new product, developing financial information for the new product, and developing a new product implementation schedule.

5. The system of claim 1 wherein the implementation planning software is operational to direct the processor to perform at least one task selected from the group consisting of:

developing a market plan for the new product, determining pricing for the new product, identifying sales channels for the new product, developing a communications plan for the new product, defining engineering and installation plans for the new product, determining customer care and operations for the new product, developing an operations systems support plan for the new product, developing a billing and accounting plan for the new product, determining a financial budget for the new product, determining a human resources impact for the new product and determining training requirements for the new product.

6. The system of claim 1 wherein the product launching software is operational to direct the processor to perform at least one task selected from the group consisting of:

developing a market plan for the new product, determining pricing for the new product, identifying sales channels for the new product, developing a communications plan for the new product, defining engineering and installation plans for the new product, determining customer care and operations for the new product, developing an operations systems support plan for the new product, developing a billing and accounting plan for the new product, determining a financial budget for the new product, determining a human resources impact for the new product and determining training requirements for the new product.

7. The system of claim 1 further comprising:

communications log software operational when executed by the processor to direct the processor to maintain a communications log of information received into the computer from the product idea managing software, the opportunity assessment software, the business planning software, the implementation planning software and the product launching software.

8. The system of claim 7 wherein the communications log information comprises:

comments regarding the new product, the author of the comments, the date the comments are entered into the computer and an identifier for the author of the comments.

9. The system of claim 1 wherein the computer is operational to receive the idea information, opportunity assessment information, business planning information, implementation information and overall product information and provide the idea information, opportunity assessment information, business planning information, implementation information and overall product information by way of remote stations.

10. A computer-readable medium having computer-readable instructions for performing a method of operating an automated computer based product development system, the method comprising:

receiving idea information describing a new product into a computer;

evaluating the idea information based on predetermined criteria;

receiving opportunity assessment information into the computer;

processing the opportunity assessment information and at least a portion of the idea information to generate an opportunity assessment report;

receiving business planning information into the computer;

processing the business planning information and at least a portion of the opportunity assessment information to generate a business plan;

receiving implementation information into the computer;

processing the implementation information, at least a portion of the business planning information and at least a portion of the opportunity assessment information to generate an implementation plan;

receiving overall product information into the computer; and processing the overall product information, at least a portion of the implementation information, at least a portion of the business planning information and at least a portion of the opportunity assessment information to generate a product launching plan.

11. The method of claim 10 wherein receiving the idea information further comprises:

receiving information into the computer describing the need for the new product;

receiving information into the computer describing an idea for the new product;

assigning a responsible person for evaluating the idea;

evaluating the idea in accordance with the predetermined criteria;

receiving information into the computer indicating whether another one of an opportunity assessment software, a business planning software, an implementation planning software and a product launching software should be executed.

12. The method of claim 10 wherein receiving opportunity assessment information further comprises:

receiving information into the computer indicating the evaluation of the new product with regard to the predetermined criteria.

13. The method of claim 10 wherein processing the business planning information further comprises at least one step selected from the group consisting of:

developing a product description;

performing a market analysis for the new product;

determining a strategic fit for the new product;

performing a technology analysis for the new product;

developing a marketing strategy for the new product;

developing financial information for the new product; and developing a product implementation schedule.

14. The method of claim 10 wherein processing the opportunity assessment information further comprises at least one step selected from the group consisting of:

developing a market plan for the new product;

determining pricing for the new product;

identifying sales channels for the new product;

developing a communications plan for the new product;

defining engineering and installation plans for the new product;

determining customer care and operations for the new product;

developing an operations systems support plan for the new product;

developing a billing and accounting plan for the new product;

determining a financial budget for the new product;

determining a human resources impact for the new product; and determining training requirements for the new product.

15. The method of claim 10 wherein processing the opportunity assessment information further comprises:

developing a market plan for the new product;

determining pricing for the new product;

identifying sales channels for the new product;

developing a communications plan for the new product;

defining engineering and installation plans for the new product;

determining customer care and operations for the new product;

developing an operations systems support plan for the new product;

developing a billing and accounting plan for the new product;

determining a financial budget for the new product;

determining a human resources impact for the new product; and determining training requirements for the new product.

16. The method of claim 10 the method further comprising:

maintaining a communications log of information received into the computer from the product idea managing software, the opportunity assessment software, the business planning software, the implementation planning software and the product launching software.

17. The method of claim 16 wherein the communications log information comprises:

comments regarding the product, the author of the comments, the date the comments are entered and an identifier for the author of the comments.

18. The method of claim 10 the method further comprising:

receiving the idea information, opportunity assessment information, business planning information, implementation information and overall product information; and providing the idea information, opportunity assessment information, business planning information, implementation information and overall product information by way of remote stations.

* * * * *